UNITED STATES PATENT OFFICE.

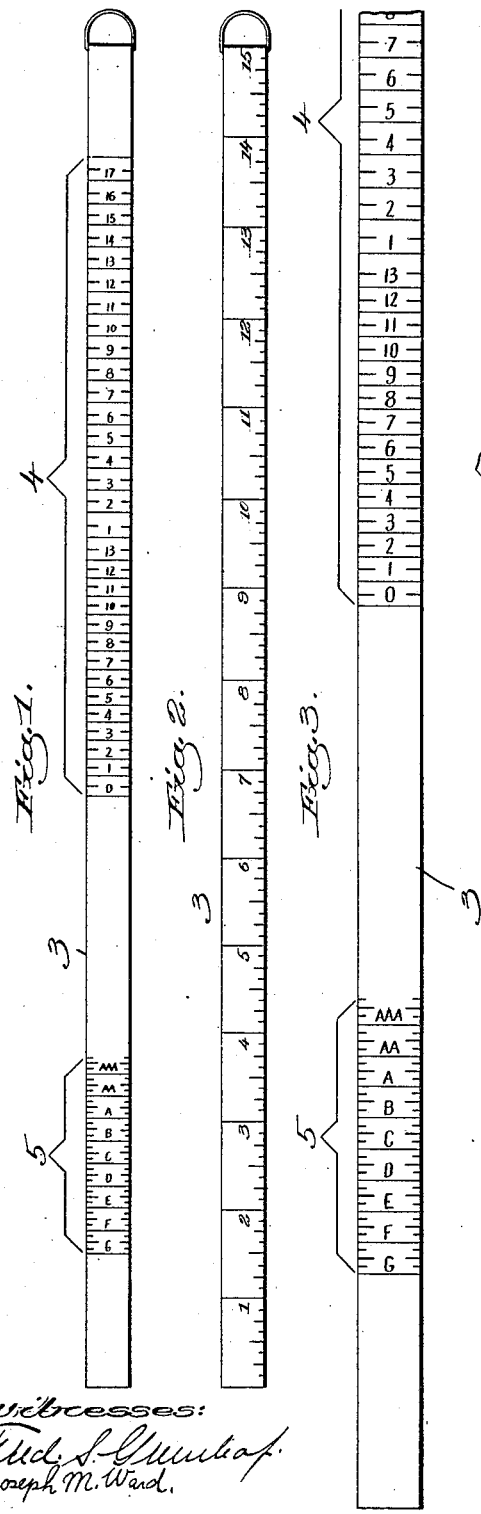

GEORGE E. BELCHER, OF STOUGHTON, MASSACHUSETTS.

TAPE FOR MEASURING LASTS.

No. 913,454.  Specification of Letters Patent.  Patented Feb. 23, 1909.

Application filed March 16, 1908. Serial No. 421,389.

*To all whom it may concern:*

Be it known that I, GEORGE E. BELCHER, a citizen of the United States, residing at Stoughton, county of Norfolk, and State of Massachusetts, have invented an Improvement in Tape for Measuring Lasts, of which the following description, in connection with the accompanying drawing, is a specification, like characters on the drawing representing like parts.

This invention has for its object to provide a novel tape or measure designed particularly for measuring the size of lasts, although the tape may also be used for measuring a person's foot to determine the proper width of a shoe to fit the foot. There is a certain definite relation existing between the width of a shoe and the length thereof, and this relation is commonly expressed in the form of tables with which shoe-makers and shoe manufacturers are usually provided. One common way of arranging such tables is to provide a table of sizes indicating the length of shoes and to have corresponding tables giving in inches the girth measure of lasts at the ball, waist and instep for different widths of the different sizes. Such an arrangement of tables is somewhat complicated and is sometimes more or less difficult to use. For instance, if it is desired to know the width size of a certain last when the length size is known, it is necessary to apply a tape measure to the last and measure the girth thereof at the ball, instep or waist portion, and after noting the girth measure in inches refer to the tables for this particular length size and find which width size had a girth measure the same as that of the last in question. Similarly in determining the width size of a person's shoe, it is necessary to first find the length size then measure in inches the girth of the foot at the ball, instep or waist and then refer to the tables to determine which width size corresponding to the length size of the foot had a girth measure equal to that of the foot measured.

In making my invention I have provided a tape which will indicate the width size of a foot or last when the length size thereof is known by simply placing the tape around the ball of the last or foot and reading the measure given. My improved tape, therefore, takes the place of the tables now commonly employed and furnishes a simple means for correctly testing any last or getting the width size of a person's foot. In order to secure this end I propose to place my measure on a flexible tape which can be made to encircle a last or foot to give the girth measure, and this tape has on one portion thereof a scale of width sizes and on another portion thereof a scale numbered to indicate different length sizes. These two scales have such a relation to each other that when the measure is placed around the ball of a last or foot the indication mark on the width scale corresponding to the correct size of the last or foot is alined with the indication mark on the length scale corresponding to the length of the last or foot. If the length of the last or foot to be measured be known, therefore, the width thereof can be readily determined merely by applying my improved tape or measure to the last or foot.

In the drawings, Figure 1 is a view of one side of a tape embodying my invention; Fig. 2 shows the rear side of the tape which is marked off in inches; Fig. 3 is a view on an enlarged scale of the portion of the tape having thereon the width scale and a part of the portion having thereon the scale indicating the length sizes; Fig. 4 shows the manner of using my tape on a last.

I find it convenient to place the measure on a strip or tape 3 of flexible material which can be readily placed around a foot or last. This tape may be made of any suitable material such as fabric, leather or metal. It has on one portion thereof a scale 5 marked to denote the different widths of shoes, said scale being for convenience hereinafter referred to as the width scale, and it has on another portion a scale 4 which is marked to indicate the length sizes of shoes.

All shoemakers have adopted as a standard one-fourth of an inch variations between the different widths of boots and shoes, that is, the girth measure of a shoe B width is one-fourth of an inch longer than that of an A width; the girth measure of a shoe C width is one-fourth of an inch longer than that of a shoe B width, etc. In printing the width scale 5 on the tape, therefore, the division marks indicating different widths will be placed at distances one-fourth of an inch apart, and this scale may be graduated into quarter sizes if desired, although this is not essential to the invention.

The different indication marks on the scale 4 are so placed with reference to the indication marks on the width scale 5 that when the tape is placed around the ball, waist or instep of a last of a known length, the mark indicating the length of the last will come opposite the mark on the width scale corresponding to the width of the last. This proper placing of the indication marks on the scale 4 may be secured by making the distance between any two designations on the width scale and the other scale 4 equal to the girth measure of the ball of a last having a size corresponding to said designations. To illustrate what I mean the distance on the tape between the designation C on the width scale and the designation 5 on the other scale 4 is equal to the girth measure at the ball of a 5C last, and the distance on the tape between the designation E on the width scale and the designation 8 on the other scale 4 is equal to the girth measure at the ball of an 8E last, etc.

In laying off the scale 4 the proper distances from the different designations on the width scale to the different designations on the scale 4 can be secured from standard tables above refererd to which have been adopted by different shoemakers as giving the correct measurements for the different sizes of lasts. Where the tape is thus imprinted, it is a very simple matter to determine the width of any last, the length of which is known, by simply placing the tape around the ball of the last, as shown in Fig. 4, and noting which graduation on the width scale comes opposite or alines with the particular graduation on the other scale 4 denoting the length of the last. For instance, assuming that the length size of the last shown in Fig. 4 is size 8, the width thereof is determined by noting which graduation on the scale 5 comes opposite the 8 graduation on the scale 4. In the drawing the C graduation on the width scale thus comes opposite the 8 graduation on the scale 4 thus indicating that the width measure of the last is C. If, however, the last is a 9 or a 7 length, the correct width thereof is measured by noting which graduation on the width scale comes opposite the 7 or 9 graduation on the scale 4.

My improved tape can also be readily used for giving the width size of a person's foot. It is now the common practice for shoe dealers to determine the length size of a person's foot by applying a size stick thereto, and having determined the length, then the width of the shoe to fit the foot can be determined by placing my improved tape around the ball of the foot and noting which graduation mark on the width scale comes opposite the graduation on the other scale denoting the length of the foot.

My tape may be used not only to determine the width size of a last, but may also be used in connection with a size stick for gaging any last to determine if the last is correctly made. If, for instance, a person has a last which purports to be a 7C last, he can easily determine whether the last is of the proper width by merely applying the tape measure to the ball of the last, as shown in Fig. 4, and reading the measure. The length of the last can be readily determined by use of the ordinary size stick.

In all standard lasts the girth measure at the waist of the last is one-eighth of an inch smaller than the girth measure at the ball thereof, and the girth measure at the instep is three-eighths of an inch larger than that at the ball thereof. Therefore, the measurements of any last can be tested by means of my measure at the waist and instep as well as at the ball for the girth measurement at the waist of a 7D last would read on the measure $6\frac{1}{2}$D, this being so because, since the girth measure at the waist is one-eighth of an inch less than that at the ball, the 7 mark on the scale 4 should come opposite the $C\frac{1}{2}$ mark on the width scale. Similarly if the 7D last is properly made the girth measure at the instep portion would be the same as that of the girth measure at the ball portion of a $7E\frac{1}{2}$ last.

It is a convenience to place a scale in inches on the back side of the tape because it is often desirable to take a certain measurement regarding the foot or last in inches.

Having fully described my invention, what I claim as new and desire to secure by Letters Patent is:—

1. A measure for lasts or a person's foot comprising a strip of flexible material having formed on one portion thereof a width scale and on another portion thereof a scale denoting the length sizes of shoes, said scales being so positioned relative to each other that when the measure is placed around the ball of a last the mark on the width scale corresponding to the width size of the last alines with the mark on the other scale corresponding to the length size of the last.

2. A measure for lasts or a person's foot comprising a strip of flexible material having imprinted on one portion thereof a width scale and on another portion thereof a scale marked to indicate lengths, each indication mark on the latter scale being at a distance from any indication mark on the width scale corresponding to the girth measure at the ball of a last, the size of which is indicated by said two indication marks.

In testimony whereof, I have signed my name to this specification, in the presence of two subscribing witnesses.

GEORGE E. BELCHER.

Witnesses:
 PAUL S. JONES,
 RALPH P. ROWE.